US 9,298,852 B2

(12) United States Patent
Taropa et al.

(10) Patent No.: US 9,298,852 B2
(45) Date of Patent: Mar. 29, 2016

(54) RERANKING QUERY COMPLETIONS

(71) Applicant: GOOGLE INC., Mountain View, CA (US)

(72) Inventors: Emanuel Taropa, San Jose, CA (US); Jeffrey A. Dean, Palo Alto, CA (US); Simon Tong, Mountain View, CA (US); Nitin Gupta, Santa Clara, CA (US); Noam M. Shazeer, Mountain View, CA (US); Anwis Das, Sunnyvale, CA (US); Murtaza A. Basrai, Mountain View, CA (US)

(73) Assignee: Google Inc., Mountain View, CA (US)

(*) Notice: Subject to any disclaimer, the term of this patent is extended or adjusted under 35 U.S.C. 154(b) by 450 days.

(21) Appl. No.: 13/928,868

(22) Filed: Jun. 27, 2013

(65) Prior Publication Data

US 2015/0169578 A1    Jun. 18, 2015

(51) Int. Cl.
*G06F 17/30* (2006.01)
*G06F 7/00* (2006.01)

(52) U.S. Cl.
CPC ........ *G06F 17/3097* (2013.01); *G06F 17/3064* (2013.01); *G06F 17/30646* (2013.01); *G06F 17/30672* (2013.01)

(58) Field of Classification Search
CPC ................. G06F 17/30864; G06F 17/30867; G06F 17/30675; G06F 17/30696; G06Q 30/02
USPC ........................................................ 707/723
See application file for complete search history.

(56) References Cited

U.S. PATENT DOCUMENTS

| 7,917,480 | B2 | 3/2011 | Dean et al. | |
| 2006/0036593 | A1 | 2/2006 | Dean et al. | |
| 2009/0248666 | A1* | 10/2009 | Ahluwalia | G06F 17/30864 |
| 2012/0036123 | A1* | 2/2012 | Hasan | G06F 17/30386 |
| | | | | 707/723 |
| 2013/0031106 | A1* | 1/2013 | Schechter | G06F 17/3064 |
| | | | | 707/749 |
| 2014/0280291 | A1* | 9/2014 | Collins | G06F 17/3097 |
| | | | | 707/767 |

OTHER PUBLICATIONS

U.S. Appl. No. 13/928,939, filed Jun. 27, 2013, Jeffrey A. Dean.
Barroso et al., "Web Search for a Planet: The Google Cluster Architecture," IEEE Mirco, Mar.-Apr. 2003, pp. 22-28.

* cited by examiner

*Primary Examiner* — Usmaan Saeed
*Assistant Examiner* — Raquel Perez-Arroyo
(74) *Attorney, Agent, or Firm* — Fish & Richardson P.C.

(57) ABSTRACT

Methods, systems, and apparatus, including computer programs encoded on computer storage media, for reranking query completions based on activity session data. One of the methods includes receiving a query prefix from a user. Query completions are obtained for the query prefix. One or more likely queries that are likely to co-occur with a reference query in user activity sessions are obtained. If one of the likely queries matches one of the query completions, a modified ranking of the query completions is determined, including boosting a ranking of matching query completions. The modified ranking of the query completions is provided in response to receiving the query prefix.

19 Claims, 3 Drawing Sheets

RERANKING QUERY COMPLETIONS

BACKGROUND

This specification relates to search engines.

Internet search engines aim to identify resources, e.g., web pages, images, text documents, multimedia content, e.g., videos, that are relevant to a user's information needs and to present information about the resources in a manner that is most useful to the user. Internet search engines generally return a set of search results, each identifying a respective resource, in response to a user-submitted query.

Search systems that operate Internet search engines can also provide query completions to users to help users satisfy their informational needs. As used in this specification, the term "query completion" refers to a suggested sequence of one or more terms that can be used as a query. Some search systems provide query completions in a list as the user is entering a query. A user device interface for a search system typically sends input to the search system as the user enters each character of a query, and the search system provides query completions that match the entered characters. The characters sent to the search system before the user enters a search command input, e.g., hitting the "Enter" key on an input keyboard or a "search" button on a user interface, may be referred to as a "query prefix." Once the query completions are received, the user device displays the query completions for user selection. The user can select one of the query completions to submit the query completion as a query to a search system without having to type the query manually to enter the query.

FIG. 1A illustrates an example presentation 100 of query completions 120a provided in a prior art way by a search system. The example presentation 100 includes a list of query completions 120a that are provided for the two-character query prefix 105, "ba."

The query prefix 105 can be submitted to a search system by software of a graphical user interface of a web browser or by software of a user interface of some other software application installed on a user device, e.g., a mobile application installed on a mobile computing device. In response to receiving the query prefix 105, the search system can provide a search results page 100 in a form that can be presented on the user device. For example, the search results page 100 can be provided as a markup language document, e.g., a HyperText Markup Language document, and the user device can render the document, e.g., using a web browser, in order to present the search results page 100 on a display of the user device.

The search results page 100 includes query completions 120a that represent potential completions of the query prefix 105 in a ranked order. The query completion 122a, "baking," is ranked third behind "basketball" and "baseball." This may be so even if the user has implicitly, e.g., through previously submitted queries, or explicitly, e.g., through a user profile, shown a greater interest in baking than in sports. Notably, the prior art search system may not consider a previous query of the user when generating query completions 120a, or may only consider previously submitted queries that match the query prefix.

The search results page 100 also includes search results 112a and 114a, which may be provided while the user is entering the query, in other words, before the user has is finished entering the query. The search results 112a, 114a may be referred to as "instant" search results. A search system can obtain the search results 112a, 114a by obtaining search results that satisfy the currently highest-ranked query completion. In this example, the search results 112a, 114a have been obtained as search results for the highest-ranked query completion for query prefix 105, which is "basketball."

SUMMARY

This specification describes how a system can adjust an initial ranking of query completions using other queries that are likely to co-occur with a query previously entered by the user in records of user activity of many users. The previously entered query can be used as a reference query. These other queries can then be used to boost or filter queries in an initial ranking of query completions. This achieves a collaborative filtering of the query completion.

In general, one innovative aspect of the subject matter described in this specification can be embodied in methods that include the actions of receiving a query prefix from a user; obtaining query completions for the query prefix, each query completion having a ranking score, the query completions having a first ranking based on the ranking scores; obtaining a reference query; identifying one or more likely queries that are likely to co-occur with the reference query in user activity sessions; determining that one of the likely queries matches one of the query completions; determining, using one or more computers, a modified ranking of the query completions including boosting a ranking of the matching query completion; and providing the modified ranking of the query completions in response to receiving the query prefix.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Identifying one or more likely queries that are likely to co-occur with the reference query in user activity sessions comprises identifying matching user activity sessions that include an occurrence of the reference query; and computing a signal for each query occurring in the matching user activity sessions that indicates a likelihood that the query co occurs with the reference query in a same session compared to the likelihood of the query occurring over all user activity sessions. Boosting a ranking of the matching query completion comprises computing a new ranking score for the matching query completion based on multiplying an initial ranking score of the query completion by a boost value b. The boost value b is given by $$B = \frac{P(x \mid q)}{P(x)},$$

wherein P(x|q) is a measure of the likelihood of the matching query completion x occurring in an activity session given that a the reference query q also occurred in the same activity session, and P(x) is a measure of the likelihood of the query completion x appearing in an activity session. The reference query is a query that was submitted within a threshold number of queries by the user. Identifying one or more likely queries that are likely to co-occur with the reference query in user activity sessions comprises identifying the one or more likely queries using user activity sessions for at least a threshold number of users, wherein a user activity session describes activity of a particular user over a particular time period. The actions include inserting a particular query of the likely queries into the ranking of query completions, wherein the particular query did not previously occur in the ranking of query completions. Identifying one or more likely queries that are likely to co-occur with the reference query in user activity sessions comprises identifying queries that were submitted by users within a particular proximity window of the reference query. Identifying one or more likely queries that are likely to co-occur with the reference query in user activity sessions comprises obtaining a precomputed distribution of one or more likely queries for the reference query.

The subject matter described in this specification can be implemented in particular systems so as to realize one or more of the following advantages. Reranking query completions based on queries that are highly likely to co-occur with a previous query can provide users with more relevant and more personalized query completions. Users may also see useful queries that they would not have otherwise seen. This can be done without relying on information about previously submitted queries of the user that match the query prefix.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system can improve query completions by considering information about a user, in particular, a query previously submitted by the user. A previously submitted query can be indicative of the interests of the user, which can be useful when determining relevant query completions for a potentially short query prefix that may be devoid of other information.

Figure 1A:
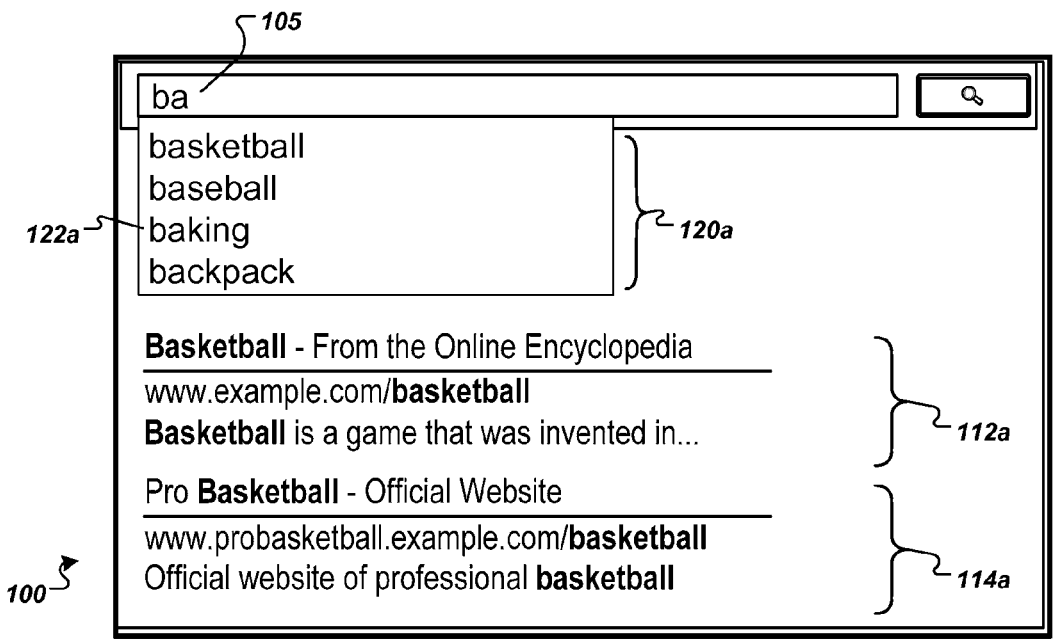
FIG. 1A illustrates an example presentation of query completions provided by a prior art search system.
Figure 1B:
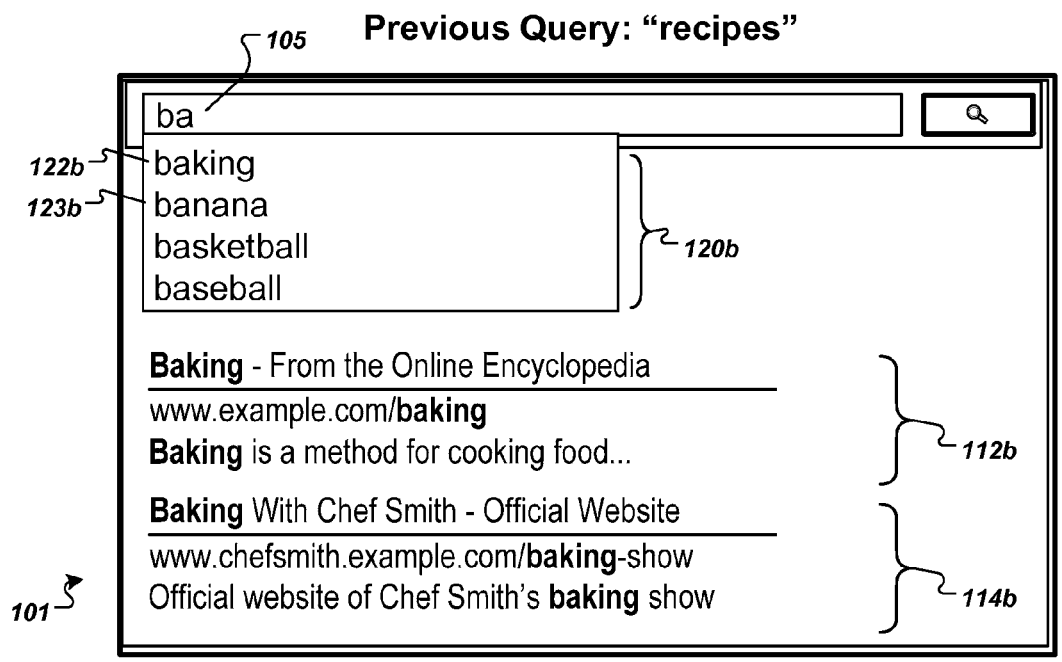
FIG. 1B illustrates an example presentation of query completions provided by a search system.

FIG. 1B illustrates an example presentation 101 of query completions 120b provided by a search system. The example presentation 101 includes a list of query completions 120b that are provided for the two character query prefix 105, "ba." However, in this example, it is assumed that the user previously submitted the query "recipes." The search system can then use this information to provide more relevant, more useful, or more personalized query completions for the user.

For example, a search system may determine that a user who has previously entered the query "recipes" is more likely to be interested in cooking than in sports. Thus, the search system can alter an initial ranking of query completions to boost query completions that may be likely to co-occur in user activity data with the previous query "recipes." For example, the search system can alter the initial ranking of query completions by boosting the query completion 122b "baking" to the top of the ranking of query completions 120b. The search system may also provide the user additional queries that otherwise would not appear among a number of top-ranked query completions. For example, the search system can provide query completion 123b "banana" near the top of the ranking of query completions 120b because "banana" is more likely to be co-occur in user activity with the previous query "recipes" than sports terms, e.g., "basketball" and "baseball."

Altering the ranking of query completions 120b may also result in the search system providing more relevant search results for a query prefix. For example, the search results 112b, 114b are that were obtained for the query "baking" are more likely to be considered relevant by a user whose previous query was "recipe" than search results that relate to sports.

In some implementations, the search system provides users an opportunity to control whether previously submitted queries are stored by the system, for how long they are stored, and/or whether they may be used in reranking query completions.

Figure 2:
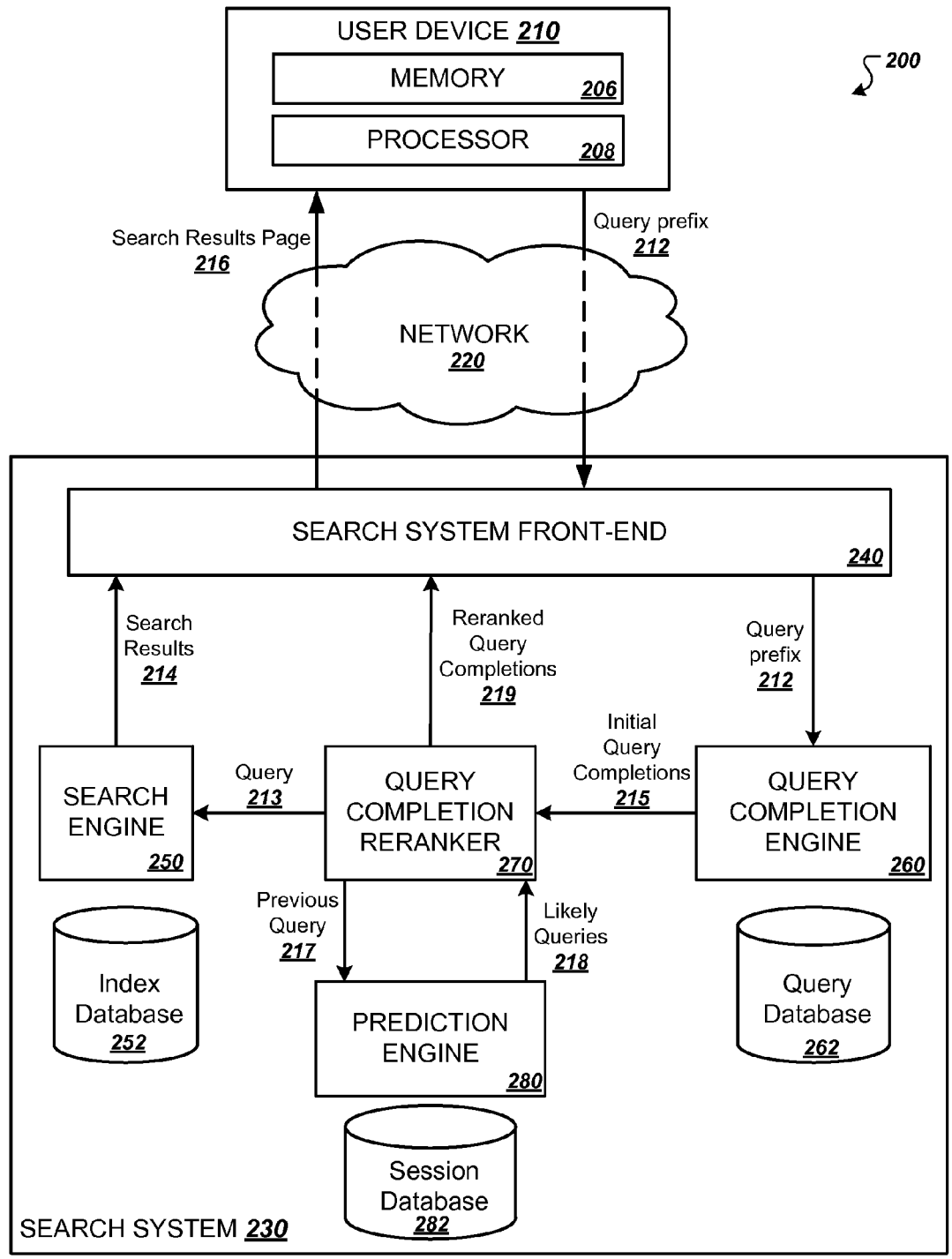
FIG. 2 is a diagram of an example system.

FIG. 2 is a diagram of an example system 200. In general, the system includes a user device 210 coupled to a search system 230 over a network 220. The search system 230 is an example of an information retrieval system in which the systems, components, and techniques described below can be implemented.

In operation, the user device 210 transmits a query prefix 212 to the search system 230, e.g., over the network 220. The query prefix 212 includes one or more characters and can include other information, for example, a location of the user device 210. The search system 230 reranks a set of initial query completions 215, to generate reranked query completions 219. The search system 230 generates a response, generally in the form of a search results page 216 that presents the reranked query completions 219. The search results page 216 can also optionally include search results 214 that are identified as responsive to a highest-ranked query completion for the query prefix 212. The search system 230 transmits the search results page 216 including the reranked query completions 215 over the network 220 back to the user device 210 for presentation to a user.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 208 for executing program instructions and memory 206, e.g., random access memory (RAM). The user device 210 can include computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a Third Generation (3G), Fourth Generation (4G), or other telecommunications network, a wired Ethernet network, a private network such as an intranet, a public network such as the Internet, or any appropriate combination of such networks.

The search system 230 can be implemented as computer programs installed on one or more computers in one or more locations that are coupled to each through a network, which may, but need not be, network 220. The search system 230 includes a search system front-end 240, a search engine 250, a query completion engine 260, a query completion reranker 270, and a prediction engine 280.

In general, the search system front-end 240 receives the query prefix 212 from the user device 210 and routes the query prefix 212 to the query completion engine 260. The search system front-end 240 also provides the resulting search results page 216 that includes reranked query completions 215 to the user device 210. In doing so, the search system front-end 240 acts as a proxy, or interface, between user devices and the search system 230.

The query completion engine 260 generates initial query completions 215 for a received query prefix 212. For example, the query completion engine 260 can analyze data stored in query database 262 that describes queries previously received by the search system. For example, the query database 262 may include data that reflects common query refinements entered by users, which the query completion engine 260 can use to generate the initial query completions 215.

In some implementations, the query completion engine 260 generates initial query completions 215 that each start with the entered characters of the query prefix 212. In some other implementations, the query completion engine 260 generates initial query completions 215 such that the query prefix 212 matches each of the initial query completions 215 anywhere in the query completion. The query completion engine 260 may also perform spelling correction or query revision techniques on query prefix 212 to generate initial query completions 215.

The designation of initial query completions 215 as "initial" is not intended to require that the query completions received by query completion reranker 270 are the first query completions that the search system has generated for the query prefix 212 or for the user that submitted the query prefix 212. For example, some of the initial query completions 215 can originate from elsewhere in the search system 230. In addition, the initial query completions 215 can be generated for any query prefix received by the search system 230, not only a first query prefix received by the search system 230.

The query completion reranker 270 receives the initial query completions 215 and can generate reranked query completions 219 by using activity session data from a session database 282.

For example, the query completion reranker 270 can compare the initial query completions 215 to one or more likely queries 218 that are determined by analyzing a potentially very large collection of activity sessions in session database 282 describing the activities of many users. The system may analyze activity sessions only when the system has data of a sufficient quantity. For example, to generate queries that are likely to co-occur with a given query in a collection of activity sessions, the system may require there to be occurrences of the given query in many sessions, e.g. more than 500 sessions, having been received from many different users, e.g. more than 100 different users. If any of the initial query completions 215 match the likely queries 218, the query completion reranker 270 can alter the ranking of the initial query completions 215 to generate reranked query completions 219.

In general, an activity session refers to data that describes activity of a particular user during a particular period of time, e.g., during one day, one week, or one month. In some implementations, the system considers a "user" to be any distinguishable source of activity, whether or not a particular individual. Additionally, certain user activity data may be treated in one or more ways before it is stored or used, so that personally identifiable information is removed. In some implementations, a user may be distinguished by, e.g., signed-in user identifier; an anonymous cookie, which identifies a particular Web browser but not necessarily a particular individual; an IP (Internet Protocol) address, which identifies a particular source of traffic on a network, but not necessarily a particular browser or individual; or by some other identifying information. In some implementations, users may be distinguished by the IP addresses of the user devices used in performing the activities. In some implementations, a user or group of users may be distinguished from other users by reference to the IP address of the user devices used in performing the activities. Multiple individuals may share IP addresses, or the activity of one individual may come from multiple IP addresses over time. In some implementations, other techniques such as signed-in user identifiers or anonymous cookies may additionally be used to distinguish between sources of activity. In some implementations, activities are recorded by the interactive system involved in the activity. In some implementations, activity information is also, or alternatively, collected by an application, e.g., a web browser toolbar, running on the user's device.

An activity can be any action performed by a user, or on behalf of a user, on any interactive system, e.g., a web search system, an image search system, a map system, an e-mail system, a social network system, a blogging system, a shopping system, just to name a few. An activity can also be an action directed to a user, e.g., a receipt of an e-mail message, or a higher level task. An activity can also be a status, e.g., that a user has an interest in film noir. The session activity data may also include additional types of information, e.g., a location where each query was issued.

A user action can be, for example, the submission of a particular query; the selection, in response to a particular query, of a particular search result, or of any search result; a visit, or a long visit, to a particular web site, page, or image; the viewing of a video; the submission of a request for directions to a point of interest; the receipt of a message confirming a hotel, flight, or restaurant reservation, or confirming purchase of a particular product or kind of product, or of a particular service or kind of service.

In some implementations, the sessions are defined as non-overlapping periods of a fixed length, e.g., one, two, three, five, seven, or ten days, or as overlapping periods of fixed length, in which case some activities could appear in more than one session. In some implementations, the activity sessions are aligned to start and end on the same schedule. For convenience, the session may be said to "contain" activity records or, for brevity, to "contain" activities; similarly, an activity or an activity record may be said to be "found in" a session. In some implementations, each session is represented by a separate document that includes describing user activities as segments of text. Thus, according to context, the term "session" can also refer to the collected activity records assigned to a session, or a document representing the session. The query completion reranker 270 can provide the previous query 217 to a prediction engine 280 and can obtain likely queries 218 in response to providing the previous query 217. The prediction engine 280 may also receive the previous query 217 from another module in the search system 230, e.g., from the search system front-end 240, search engine 250, or from query database 262.

The prediction engine 280 can determine correlations in large collections of data describing the activities of many users. The prediction engine 280 can maintain a session database 282 that stores user session data. An example prediction engine 280 is described in commonly-owned U.S. patent application Ser. No. 13/928,939, for "Generalized Engine For Predicting Actions", to Jeffrey A. Dean, which is incorporated here by reference.

The query completion reranker 270 generally reranks the initial query completions 215 by providing the previous query 217 of a user to the prediction engine 280. The prediction engine 280 can then use the previous query 217 to obtain likely queries 218 and return the likely queries 218 to the query completion reranker 270.

Then, if any of the likely queries 218 match the initial query completions 215, the query completion reranker 270 can promote the matching query completions so that the reranked query completions 219 are more likely to include query completions that are likely to co-occur with the user's previous query in user activity sessions.

If the search results page 216 will also include search results, e.g. web search results that identify resources on the Internet, the query completion reranker 270 can provide a highest-ranked query completion 213 to a search engine 250. The search engine 250 will generally include an indexing engine for indexing resources in a collection of resources. For example, the search engine 250 can index web pages found in a collection of web pages, e.g., web pages on the Internet. A collection of resources indexed by the indexing engine may, but need not, be stored within search system 230, e.g. in index database 252. In response to a received query 213, which may be a highest-ranked query completion, the search engine 250 can generate search results 214 that identify resources in the indexed collection. The search engine 250 can rank the search results 214 using conventional methods and route the ranked search results 214 back to search system front-end 240 for inclusion in the search results page 216.

Figure 3:
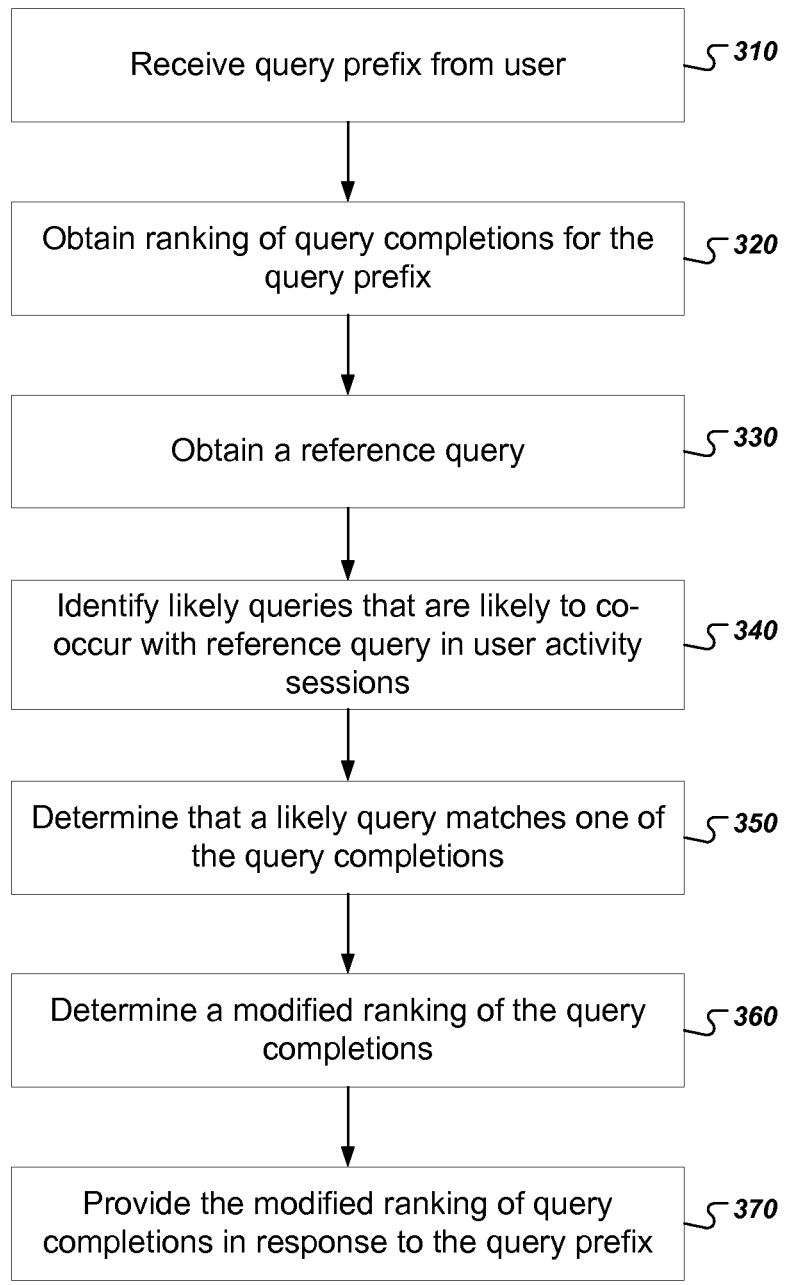
FIG. 3 is a flow chart of an example process for reranking query completions using correlation data.

FIG. 3 is a flow chart of an example process for reranking query completions using likely queries. In general, the system receives a query prefix, an initial ranking of query completions, and a one or more likely queries that are likely to co-occur with a reference query in user activity sessions. The system can then compute an adjusted ranking of the query completions using the likely queries. The process can be implemented by one or more computer programs installed on one or more computers. The process will be described as being performed by a system of one or more appropriately programmed computers, e.g., the query completion reranker 270 of FIG. 1.

The system receives a query prefix from a user (310).

The system obtains a ranking of query completions for the query prefix (320). Each query completion will have a respective ranking score, and the ranking of query completions will be determined by ordering the query completions according to their respective scores.

TABLE 1 illustrates an example ranking of query completions and associated ranking scores for the query prefix "ba."

TABLE 1

| INITIAL QUERY COMPLETIONS FOR "BA" | SCORE |
| --- | --- |
| basketball | 0.90 |
| baseball | 0.85 |
| baking | 0.70 |
| backpack | 0.63 |
| banking | 0.50 |

The system obtains a reference query (330). In some implementations, the system uses a most-recently submitted query by the user. In addition, the system can also consider other queries that were submitted within a threshold number of queries before the reference query. In other words, the system can also consider the second most-recently submitted query, the third most-recently submitted query, and so on.

The system identifies likely queries that are likely to co-occur with the reference query in user activity sessions (340). In general, a "likely" query is a query that co-occurs with the reference query in activity sessions with more likelihood than in activity sessions in general. The likely queries will each have a respective score. The score for a likely query may represent a significance of a correlation between the likely query and the previous query.

For example, TABLE 2 illustrates an example ranking of queries and associated scores for queries that co-occur with the reference query "recipe" in user activity sessions.

TABLE 2

| LIKELY QUERIES FOR "RECIPE" | SCORE |
| --- | --- |
| cooking | 0.93 |
| food | 0.91 |
| meals | 0.87 |
| baking | 0.84 |
| cookies | 0.70 |
| decorating | 0.65 |
| banana | 0.52 |

The system can identify likely queries by identifying matching user activity sessions that include an occurrence of the reference query. The system can then compute a score, or signal, for each query in the matching sessions that indicates a likelihood that the query co-occurs with the reference query in a same session, compared to the likelihood of the query occurring over all user activity sessions.

The co-occurrences in the activity sessions need not be time-ordered. For example, the system can analyze all queries that are submitted at some time before or after a given query to identify likely queries. Similarly, the system can analyze all URLs visited by users sometime before or after submitting a particular query.

However, the system may impose time or activity proximity windows for two events to be considered co-occurring. For example, the system may consider two queries to co-occur in an activity session if they were both issued within a particular length of time of each other, e.g. within one day of each other. As another example, the system can consider two queries to co-occur in an activity session if they were both issued within a particular number of queries of each other, e.g. within 10 submitted queries of one another. In some implementations, the system generates correlations by using conventional collaborative filtering techniques.

Generally, the system can also predict many other types of likely user activities under a number of different conditions. For example, the system can also generate resource locations, e.g. URLs, that are likely to co-occur with a given query by virtue of many users frequently navigating to the particular resource location during an activity session that also includes the given query. The system may also generate likely queries that are likely to occur in user activity sessions of users having a particular interest, being located in a particular geographic location, or having a preference for a particular language. Thus, while the example process is described as identifying a number of likely queries that are likely to co-occur with a previously submitted reference query, the system could alternatively use the activity sessions to determine a queries that are likely to be submitted by users having a particular interest, e.g., as indicated by the user's profile.

The system can determine the likely queries in an "online" fashion, e.g., by searching the activity sessions after the query prefix is received. Thus, the system may be implemented as a highly distributed serving system to reduce the latency required to obtain the likely queries.

Alternatively, the system can precompute distributions of likely queries for a number of queries, e.g. a number of most-popular queries received by the system. Then, upon receiving a reference query, the system need only consult the appropriate precomputed distribution for the reference query. In some implementations, the system stores the precomputed distributions in tables, where each table is associated with a particular query. The tables can be implemented, for example, as a database that uses a query as a key for accessing each precomputed table.

The system can also adaptively determine how much computing time to devote to precomputing distributions of likely queries based on a popularity of the reference query. Thus, the system can precompute a greater number of likely queries for more popular reference queries than for less popular reference queries. In addition, the system can determine to use a larger collection of activity session data to compute likely queries for more popular reference queries than for less popular reference queries.

The system determines that one of the likely queries matches one of the query completions (350). A query completion occurring in the initial ranking of query completions and in the likely queries can indicate that the query completion is a good completion for the received query prefix and also that it is relevant to what the user has recently been searching for. For example, referring to TABLE 2, the query "baking" matches a query that occurred in the initial ranking of query completions as shown in TABLE 1.

Alternatively, the system can insert a new likely query into the ranking of query completions regardless of whether or not there is a match. For example, referring to TABLE 2, the query "banana" did not occur in the initial ranking of query completions illustrated in TABLE 1. However, the system may still include "banana" in the ranking of query completions provided to the user when it is likely to co-occur in user activity sessions with the reference query, "recipes." In addition, although "banana" begins with the query prefix "ba," the system need not require that identified likely queries also begin with the query prefix in order to be inserted into the ranking of query completions.

The system determines a modified ranking of the query completions (360). In general, the system will boost a ranking of the matching completion. For example, the system can apply a promotion to a score associated with the query completion in the initial ranking of query completions. Alternatively, the system can promote the matching completion to the top-ranked position in the ranking of query completions.

TABLE 3 is an example of a modified ranking of the query completions. In TABLE 3, the matching queries, "baking" and "banana," have been boosted in the ranking from their initial positions in TABLE 1.

TABLE 3

| RERANKED QUERY COMPLETIONS FOR "BA" | SCORE |
| --- | --- |
| baking | 0.94 |
| basketball | 0.90 |
| banana | 0.87 |
| baseball | 0.85 |

TABLE 3-continued

| RERANKED QUERY COMPLETIONS FOR "BA" | SCORE |
| --- | --- |
| backpack | 0.63 |
| banking | 0.50 |

In some implementations, the system computes a score boost for a matching query completion x based on the probability $P(x|q)$ of the query completion x occurring in an activity session given that a the reference query q also occurred in the same activity session, compared to the probability $P(x)$ of the query completion x appearing in an activity session. For example, the system can compute a boost B that is given by:

$$B = \frac{P(x|q)}{P(x)}. \qquad (1)$$

The system can then compute a new score S' for a matching query completion having an initial score S according to:

$S' = B \times S.$

After computing a new score for the query completion, the system can rerank the query completions accordingly, which will generally cause the matching query completion to be promoted in the ranking.

The system can estimate $P(x|q)$ and $P(x)$ using a number of occurrences of each event in the activity sessions. For example, the system can compute $P(x|q)$ according to a number of times $N_{x,q}$ a session included the query completion x and the reference query q, divided by a number of times $N_q$ a session included the reference query q, given by:

$$P(x|q) = \frac{N_{x,q}}{N_q}. \qquad (2)$$

Similarly, the system can compute $P(x)$ according to a number of times $N_x$ a session included the query completion x, divided by a total number of sessions N, given by:

$$P(x) = \frac{N_x}{N}.$$

In some implementations, the system uses a minimum $n_{min}$ on the number of sessions $N_x$ that include the query completion x, e.g. at least 10, 100, or 10,000 sessions. If the number of sessions $N_x$ that include the query completion x is below the minimum $n_{min}$, the system can apply a penalty when computing the boost value B in order to account for the low number of occurrences of the query completion x. For example, the system can inflate the denominator value in equation (1) corresponding to $P(x)$ so that the boost B is smaller. In some implementations, the system inflates the denominator value of $P(x)$ by promoting the value of $N_x$ according to:

$N_x = \max(2 \times n_{min} - N_x, N_x).$

The system can also mitigate the effects of rare terms by constraining the value of $P(x|q)$ to a particular value that is within a binomial proportion confidence interval. In other words, the system computes a binomial proportion confidence interval for $P(x|q)$ at a selected level of confidence, e.g.

80%, 90%, or 95%, using a particular confidence interval formula, e.g. the normal approximation interval, the Wilson score interval, or some other confidence interval. The system can then use a value of P(x|q) that falls within the confidence interval. In some implementations, rather than computing P(x|q) by equation (2) directly, the system computes the lower bound for the chosen confidence interval and uses the lower bound as P(x|q).

When computing the boost B, the system can also bias the boost B toward rare or toward frequently occurring terms by using an exponent e on P(x). In other words, the system can compute the value of B according to:

$$B = \frac{P(x \mid q)}{P(x)^e}.$$

The system can choose a lower exponent e to bias the boost B toward rare terms, e.g. an exponent e between 0.5 and 1.0, and the system can choose a higher exponent e to bias toward frequently-occurring terms, e.g. an exponent e between 1.0 and 1.5.

The system provides the modified ranking of the query completions in response to receiving the query prefix (370). After providing the modified ranking of query completions to the user, the user may be presented with query completions that are more likely to satisfy his or her informational need.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   receiving a query prefix from a user;
   obtaining query completions for the query prefix, each query completion having a respective ranking score, the query completions having a first ranking based on the ranking scores;
   obtaining a reference query for the user;
   identifying matching user activity sessions, the matching user activity sessions being user activity session that each include an occurrence of the reference query;
   identifying one or more likely queries, the likely queries being queries that occur in the matching user activity sessions, wherein each of the likely queries is associated with a respective likelihood score, wherein the likelihood score represents a likelihood of the likely query occurring in the matching user activity sessions relative to a likelihood of the likely query occurring over all user activity sessions;
   designating, as a matching query completion, a first query completion of the query completions that matches a first likely query of the one or more likely queries;
   boosting the ranking score for the matching query completion by an amount based on the likelihood score associated with the first likely query;
   determining a modified ranking of the query completions using the boosted ranking score of the matching query completion; and
   providing the modified ranking of the query completions in response to receiving the query prefix.

2. The system of claim 1, wherein boosting the ranking score for the matching query completion comprises computing a new ranking score for the matching query completion based on multiplying an initial ranking score for the matching query completion by a boost value B, wherein B is based on the likelihood score associated with the first likely query.

3. The system of claim 2, wherein the boost value B is given by:

$$B = \frac{P(x \mid q)}{P(x)},$$

wherein $P(x|q)$ is a measure of the likelihood of the matching query completion x occurring in an activity session given that a the reference query q also occurred in the same activity session, and $P(x)$ is a measure of the likelihood of the query completion x appearing in an activity session.

4. The system of claim 1, wherein the reference query is a query that was submitted within a threshold number of queries of the query prefix by the user.

5. The system of claim 1, wherein identifying the one or more likely queries comprises:
   identifying the one or more likely queries using user activity sessions for at least a threshold number of users, wherein a user activity session describes activity of a particular user over a particular time period.

6. The system of claim 5, wherein the instructions are further operable to cause the one or more computers to perform operations comprising:
inserting a particular query of the likely queries into the ranking of query completions, wherein the particular query did not previously occur in the ranking of query completions.

7. The system of claim 1, wherein identifying the one or more likely queries comprises identifying queries that were submitted by users within a particular proximity window of the reference query.

8. The system of claim 7, wherein the proximity window is a length of time.

9. The system of claim 7, wherein the proximity window is a number of queries submitted by the user.

10. The system of claim 1, wherein identifying the one or more likely queries comprises obtaining a precomputed distribution of one or more likely queries for the reference query.

11. A method comprising:
receiving a query prefix from a user;
obtaining query completions for the query prefix, each query completion having a respective ranking score, the query completions having a first ranking based on the ranking scores;
obtaining a reference query for the user;
identifying matching user activity sessions, the matching user activity sessions being user activity session that each include an occurrence of the reference query;
identifying one or more likely queries, the likely queries being queries that occur in the matching user activity sessions, wherein each of the likely queries is associated with a respective likelihood score, wherein the likelihood score represents a likelihood of the likely query occurring in the matching user activity sessions relative to a likelihood of the likely query occurring over all user activity sessions;
designating, as a matching query completion, a first query completion of the query completions that matches a first likely query of the one or more likely queries;
boosting the ranking score for the matching query completion by an amount based on the likelihood score associated with the first likely query;
determining, using one or more computers, a modified ranking of the query completions using the boosted ranking score of the matching query completion; and
providing the modified ranking of the query completions in response to receiving the query prefix.

12. The method of claim 11, wherein boosting the ranking score for the matching query completion comprises computing a new ranking score for the matching query completion based on multiplying an initial ranking score for the matching query completion by a boost value B, wherein B is based on the likelihood score associated with the first likely query.

13. The method of claim 12, wherein the boost value B is given by:

$$B = \frac{P(x|q)}{P(x)},$$

wherein $P(x|q)$ is a measure of the likelihood of the matching query completion x occurring in an activity session given that a the reference query q also occurred in the same activity session, and $P(x)$ is a measure of the likelihood of the query completion x appearing in an activity session.

14. The method of claim 11, wherein the reference query is a query that was submitted within a threshold number of queries of the query prefix by the user.

15. The method of claim 11, wherein identifying the one or more likely queries comprises:
identifying the one or more likely queries using user activity sessions for at least a threshold number of users, wherein a user activity session describes activity of a particular user over a particular time period.

16. The method of claim 15, further comprising:
inserting a particular query of the likely queries into the ranking of query completions, wherein the particular query did not previously occur in the ranking of query completions.

17. The method of claim 11, wherein identifying the one or more likely queries comprises identifying queries that were submitted by users within a particular proximity window of the reference query.

18. The method of claim 11, wherein identifying one or more likely queries that are likely to co-occur with the reference query in user activity sessions comprises obtaining a precomputed distribution of one or more likely queries for the reference query.

19. A computer program product, encoded on one or more non-transitory computer storage media, comprising instructions that when executed by one or more computers cause the one or more computers to perform operations comprising:
receiving a query prefix from a user;
obtaining query completions for the query prefix, each query completion having a respective ranking score, the query completions having a first ranking based on the ranking scores;
obtaining a reference query for the user;
identifying matching user activity sessions, the matching user activity sessions being user activity session that each include an occurrence of the reference query;
identifying one or more likely queries, the likely queries being queries that occur in the matching user activity sessions, wherein each of the likely queries is associated with a respective likelihood score, wherein the likelihood score represents a likelihood of the likely query occurring in the matching user activity sessions relative to a likelihood of the likely query occurring over all user activity sessions;
designating, as a matching query completion, a first query completion of the query completions that matches a first likely query of the one or more likely queries;
boosting the ranking score for the matching query completion by an amount based on the likelihood score associated with the first likely query;
determining a modified ranking of the query completions using the boosted ranking score of the matching query completion; and
providing the modified ranking of the query completions in response to receiving the query prefix.

* * * * *